US010753622B2

(12) United States Patent
Göransson

(10) Patent No.: US 10,753,622 B2
(45) Date of Patent: Aug. 25, 2020

(54) HEATING INSTALLATION

(71) Applicant: Energy Machines S.A., Luxembourg (LU)

(72) Inventor: Hans-Göran Göransson, Sliema (MT)

(73) Assignee: Energy Machines ApS, Faaborg (DK)

( * ) Notice: Subject to any disclaimer, the term of this patent is extended or adjusted under 35 U.S.C. 154(b) by 565 days.

(21) Appl. No.: 15/524,861

(22) PCT Filed: Nov. 6, 2015

(86) PCT No.: PCT/EP2015/075930
§ 371 (c)(1),
(2) Date: May 5, 2017

(87) PCT Pub. No.: WO2016/075045
PCT Pub. Date: May 19, 2016

(65) Prior Publication Data
US 2018/0172287 A1    Jun. 21, 2018

(30) Foreign Application Priority Data
Nov. 10, 2014  (SE) ...................... 1451343

(51) Int. Cl.
*F24D 19/10*        (2006.01)
*F24D 3/18*         (2006.01)
(Continued)

(52) U.S. Cl.
CPC .......... *F24D 19/1072* (2013.01); *F24D 3/08* (2013.01); *F24D 3/082* (2013.01); *F24D 3/18* (2013.01);
(Continued)

(58) Field of Classification Search
USPC ....................................... 237/2 B
See application file for complete search history.

(56) References Cited

U.S. PATENT DOCUMENTS 4,012,920 A  *  3/1977  Kirschbaum ............. F24F 5/00
                                                    62/235.1
4,507,938 A  *  4/1985  Hama ................. F24D 11/0214
                                                    62/324.1
(Continued)

FOREIGN PATENT DOCUMENTS

DE    10 2009 054126 A1    5/2011
EP         1 819 967 A1    8/2007
(Continued)

*Primary Examiner* — Grant Moubry
*Assistant Examiner* — John E Bargero
(74) *Attorney, Agent, or Firm* — Dilworth & Barrese, LLP

(57) ABSTRACT

A heating installation comprising: a first circuit (C1); a second circuit (C2); a first heat pump (4) for heating the medium in the first circuit; a heat exchanger (10) which is arranged in the second circuit and connected between a condenser (4b) and an expansion valve (4d) of the first heat pump; a second heat pump (11) arranged for heating a medium by absorbing heat energy from the medium in the second circuit; and a first and a second accumulator tank (A1, A2) arranged in series in the second circuit for accumulating the medium in the second circuit. The accumulator tanks are alternately connectable to the second heat pump in order to allow medium to circulate between the first accumulator tank and the evaporator of the second heat pump in a first operating situation and allow medium to circulate between the second accumulator tank and the evaporator of the second heat pump in a second operating situation.

11 Claims, 6 Drawing Sheets

(51) Int. Cl.
  *F24D 17/02*    (2006.01)
  *F24D 11/02*    (2006.01)
  *F24D 3/08*     (2006.01)

(52) U.S. Cl.
  CPC .......... *F24D 11/0214* (2013.01); *F24D 17/02* (2013.01); *Y02B 30/12* (2013.01)

(56) References Cited

U.S. PATENT DOCUMENTS

| | | | |
|---|---|---|---|
| 8,037,931 B2 * | 10/2011 | Penev | F24D 17/0021 165/201 |
| 2008/0196431 A1 * | 8/2008 | Goransson | F24D 3/18 62/238.6 |
| 2010/0000709 A1 | 1/2010 | Chang | |

FOREIGN PATENT DOCUMENTS

| | | |
|---|---|---|
| WO | 2006/054804 A1 | 5/2006 |
| WO | 20061057594 A1 | 6/2006 |
| WO | 2006/101404 A2 | 9/2006 |
| WO | 2011/023289 A2 | 3/2011 |

* cited by examiner

HEATING INSTALLATION

FIELD OF THE INVENTION AND PRIOR ART

The present invention relates to a heating installation according to the preamble of claim 1.

A heating installation according to the preamble of claim 1 is previously known from the patent document WO 2006/057594 A1. The heating installation disclosed in WO 2006/057594 A1 comprises a first heat pump for heating a medium in a first circuit. A heat exchanger connected between the condenser and the expansion valve of the first heat pump is used for transferring heat from the working medium of the heat pump to a medium in a second circuit, wherein a second heat pump is arranged for heating a medium by absorbing heat energy from the medium in the second circuit.

OBJECT OF THE INVENTION

The object of the present invention is to achieve a further development of a heating installation of the type described above in order to provide a heating installation with a configuration which in at least some aspect offers an advantage as compared to this previously known heating installation.

SUMMARY OF THE INVENTION

According to the invention, said object is achieved by a heating installation having the features defined herein.

The heating installation according to the invention comprises:
- a first circuit containing a medium;
- a second circuit containing a medium;
- a first heat pump arranged for heating the medium in the first circuit;
- a heat exchanger which is arranged in the second circuit and which is connected between a condenser and an expansion valve of the first heat pump in order to transfer heat from a working medium of the first heat pump to the medium in the second circuit;
- a second heat pump arranged for heating a medium by absorbing heat energy from the medium in the second circuit, wherein the second heat pump has its input side connected to the second circuit so that heat exchange between the medium in the second circuit and a working medium of the second heat pump is possible via an evaporator of the second heat pump; and
- a first accumulator tank and a second accumulator tank arranged in series with each other in the second circuit for accumulating the medium in the second circuit, wherein the second accumulator tank is arranged in the second circuit downstream of the first accumulator tank as seen in a flow direction from an outlet of said heat exchanger to an inlet thereof.

The first and second accumulator tanks are alternately connectable to the second heat pump in order to allow medium to circulate between the first accumulator tank and the evaporator of the second heat pump in a first operating situation and allow medium to circulate between the second accumulator tank and the evaporator of the second heat pump in a second operating situation.

The above-mentioned heat exchanger constitutes a so-called subcooler of the first heat pump and is used in order to transfer heat from the working medium of the first heat pump to the medium in the second circuit, wherein the second heat pump is arranged to utilize heat energy from the medium in the second circuit in order to satisfy desired heating demands. Hereby, surplus heat of the working medium of the first heat pump may be utilized for suitable heating purposes instead of being wasted, and an increase of the efficiency of the first heat pump is obtained.

Heat is emitted from the first accumulator tank at the same time as heat is accumulated in the second accumulator tank when the second heat pump is supplied with medium from the first accumulator tank, whereas heat is emitted from the second accumulator tank at the same time as heat is accumulated in the first accumulator tank when the second heat pump instead is supplied with medium from the second accumulator tank. Hereby, the second heat pump is enabled to utilize the heat energy of the medium in the second circuit in an efficient manner at the same time as the second heat pump in co-operation with the second accumulator tank can be used in order to ensure that the temperature of the medium in the second circuit has been lowered to a temperature within a predetermined temperature interval before this medium is returned to said heat exchanger. The solution according to the invention makes it possible, in a simple manner, to ensure a desired cooling of the medium in the second circuit before the medium is conveyed into said heat exchanger, which in its turn makes it possible for the heat exchanger to achieve an efficient subcooling of the working medium of the first heat pump. Furthermore, a larger amount of heated medium may be kept available in the second circuit by means of the accumulator tanks, and it will thereby be possible to satisfy heating demands by means of the second heat pump by utilizing the heat energy of the medium in the second circuit even in situations when the first heat pump is temporary out of operation.

Other favourable features of the heating installation according to the invention will appear from the the description following below.

BRIEF DESCRIPTION OF THE DRAWINGS

The invention will in the following be more closely described by means of embodiment examples, with reference to the appended drawings. It is shown in.

DETAILED DESCRIPTION OF EMBODIMENTS OF THE INVENTION

Figure 1:
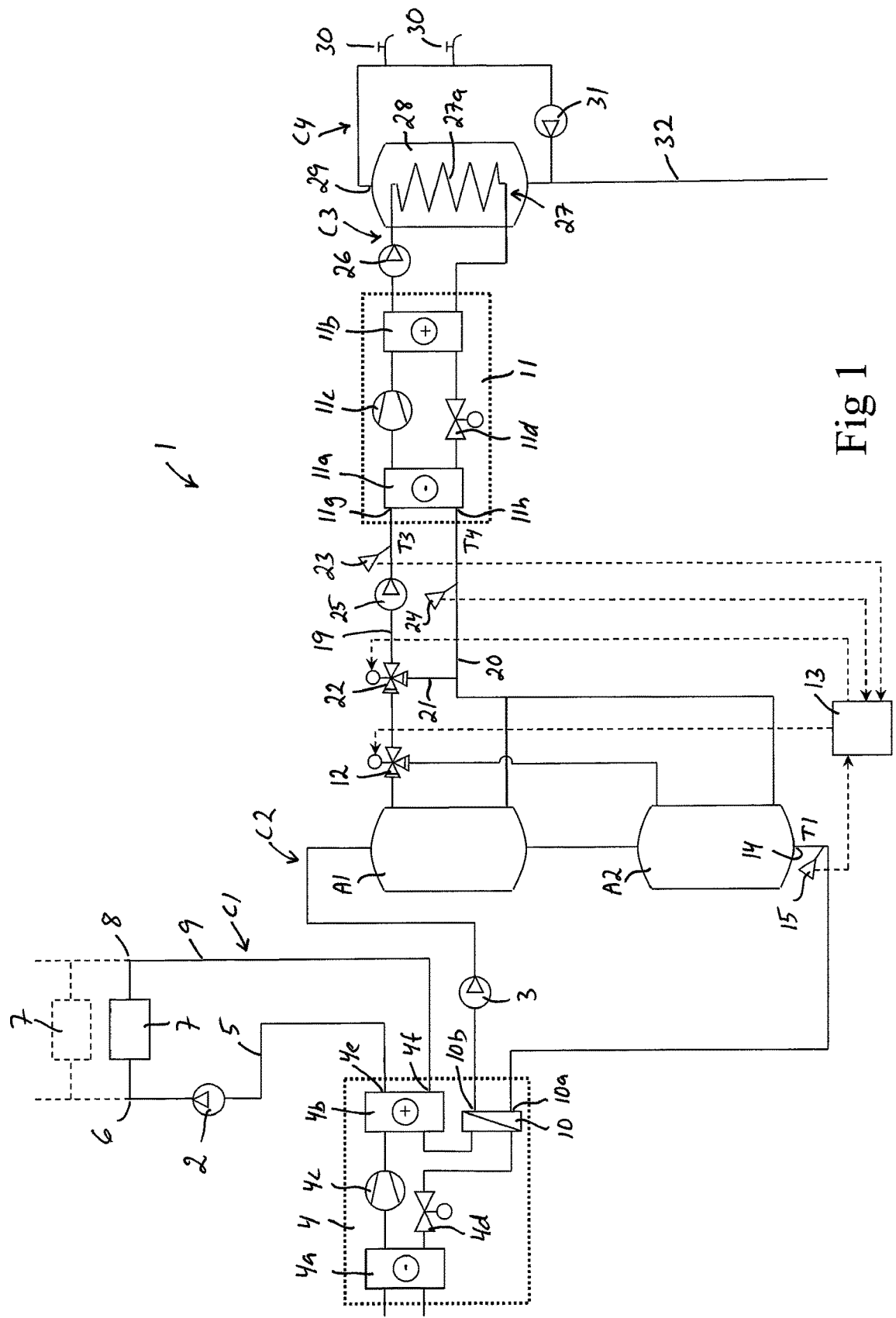
FIG. 1 a schematic illustration of a heating installation according to a first embodiment of the present invention, FIG. 2 a schematic illustration of a heating installation according to a second embodiment of the invention, FIG. 3 a schematic illustration of a heating installation according to a third embodiment of the invention, FIG. 4 a schematic illustration of a heating installation according to a fourth embodiment of the invention, FIG. 5 a schematic illustration of a heating installation according to a fifth embodiment of the invention, and FIG. 6 a schematic illustration of a heating installation according to a sixth embodiment of the invention.
Figure 2:
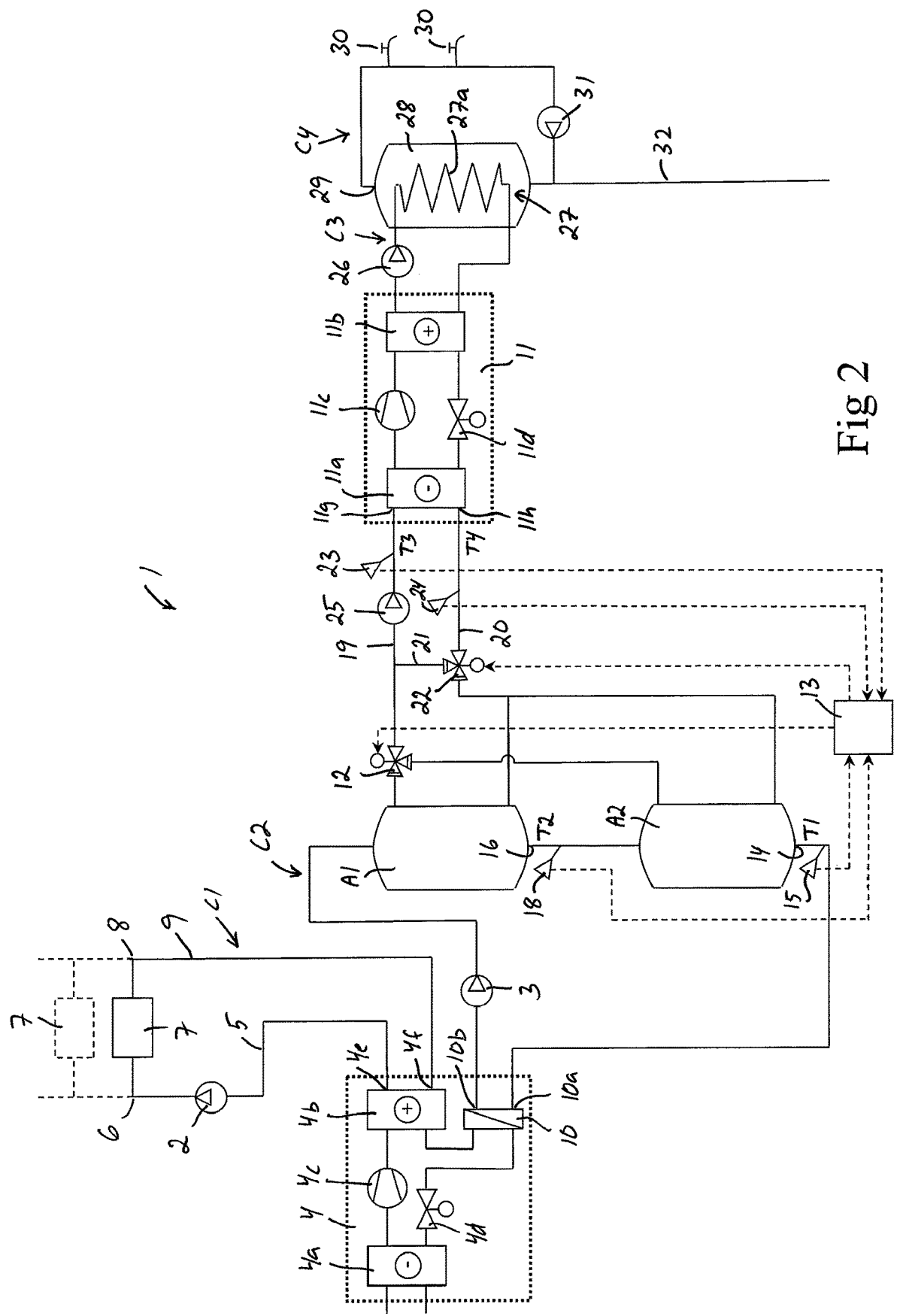
Figure 3:
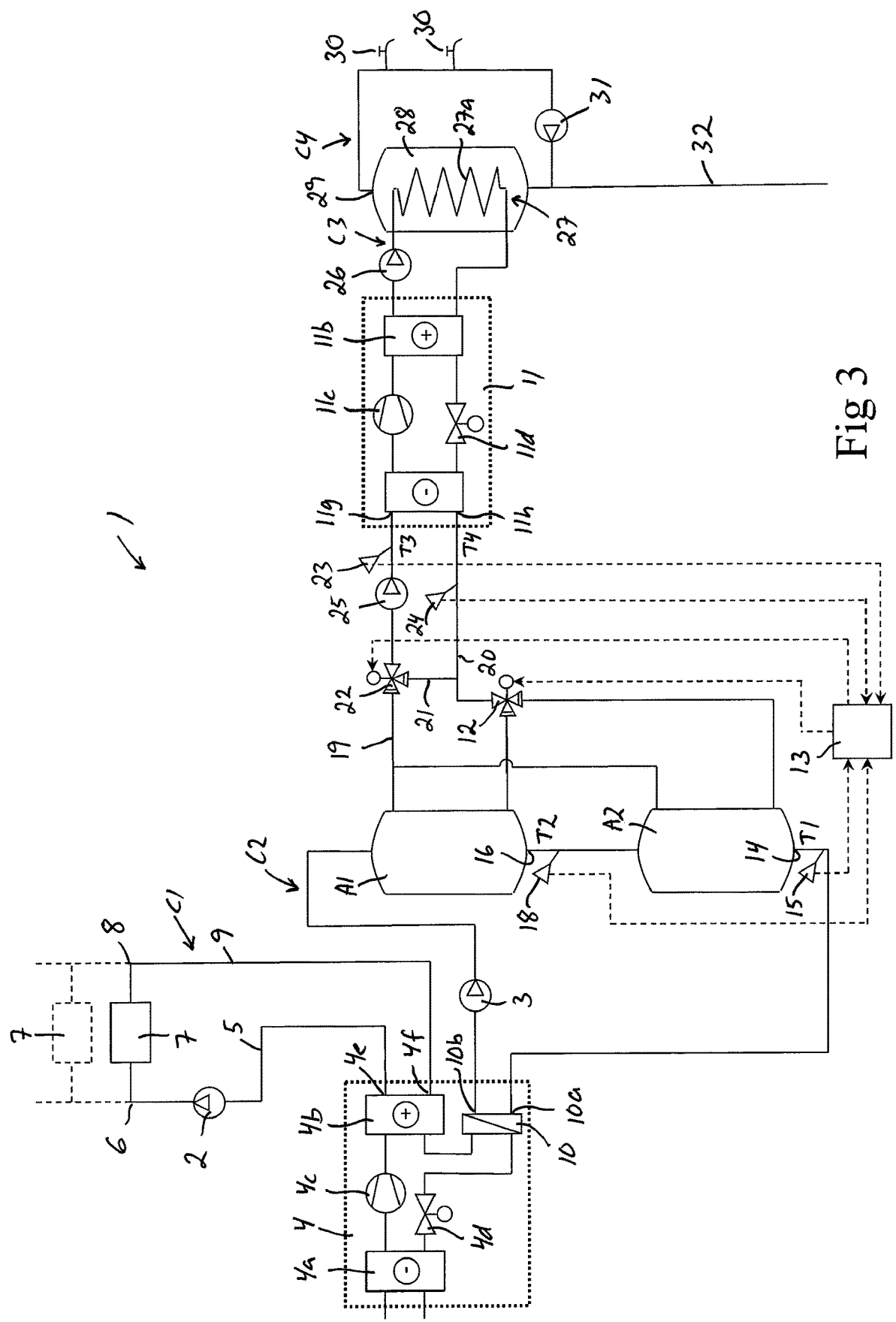

Different embodiments of a heating installation 1 according to the invention are schematically illustrated in FIGS. 1-6. The illustrated heating installations are configured for heating a house or other building and tap hot-water associated therewith. However, the heating installation according to the invention may also be configured for satisfying other types of heating demands.

The heating installation 1 according to the invention comprises a first circuit C1 and a second circuit C2, each of which containing a liquid medium, such as for instance water. A circulation pump 2 is arranged in the first circuit C1 for circulating the medium in this circuit. A circulation pump 3 is also arranged in the second circuit C2 for circulating the medium in this circuit.

The heating installation 1 comprises a first heat pump 4 which is arranged for heating the medium in the first circuit C1, for instance by utilizing geothermal heat, ground heat and/or solar heat. The first heat pump 4 comprises an evaporator 4a, a condenser 4b, a compressor 4c and an expansion valve 4d, preferably an electromechanical expansion valve. By heat exchange with a medium in a circuit, here not shown, connected to the evaporator 4a, the working medium of the heat pump absorbs heat energy via the evaporator 4a. Work is added via the compressor 4c, whereby the pressure and the temperature of the working medium is increased. In the condenser 4b, heat energy is then emitted to the medium in the first circuit C1 by heat exchange and the working medium of the heat pump is then returned to the evaporator 4a via the expansion valve 4d, the pressure and the temperature of the working medium being lowered when passing the expansion valve. The heat pump 4 has its output side connected to the first circuit C1 so that heat exchange between the working medium of the heat pump and the medium in the first circuit C1 is possible via the condenser 4b of the heat pump.

An outlet 4e of the condenser 4b of the first heat pump is by means of a feeding conduit 5 connected to the inlet 6 of one or more heat emitting devices 7. These devices 7 are used for heating a further medium, in this case the air within the building, and are for instance constituted by conventional radiators to be operated with hot-water or other medium. The outlet 8 of the heat emitting devices is by means of a return conduit 9 connected to an inlet 4f of the condenser 4b of the first heat pump.

The heating installation 1 according to the invention further comprises a heat exchanger 10 which is arranged in the second circuit C2 and connected between the condenser 4b and the expansion valve 4d of the first heat pump 4 in order to transfer heat from the working medium of the first heat pump 4 to the medium in the second circuit C2. According to the invention, the condensate of the first heat pump 4 is consequently utilized in order to supply heat energy to the medium in the second circuit C2. The heat exchanger 10 constitutes a so-called subcooler of the first heat pump 4. The heat exchanger 10 has a primary circuit through which the working medium of the first heat pump 4 is arranged to flow, and a secondary circuit which, via an inlet 10a and an outlet 10b of this secondary circuit, is connected to the second circuit C2 in order to allow the medium in the second circuit C2 to flow through the secondary circuit.

The heating installation 1 according to the invention further comprises a second heat pump 11 which is arranged for heating a medium by absorbing heat energy from the medium in the second circuit C2. The second heat pump 11 comprises an evaporator 11a, a condenser 11b, a compressor 11c and an expansion valve 11d, preferably an electromechanical expansion valve. By heat exchange with the medium in the second circuit C2 connected to the evaporator 11a, the working medium of the second heat pump absorbs heat energy via the evaporator 11a. Work is added via the compressor 11c, whereby the pressure and the temperature of the working medium of the second heat pump is increased. In the condenser 11b, heat energy is then emitted to another medium by heat exchange and the working medium of the second heat pump is then returned to the evaporator 11a via the expansion valve 11d, the pressure and the temperature of the working medium being lowered when passing the expansion valve. The second heat pump 11 has its input side connected to the second circuit C2 so that heat exchange between the medium in the second circuit C2 and the working medium of the second heat pump is possible via the evaporator 11a of the second heat pump. In the illustrated embodiments, the second heat pump 11 is arranged to emit heat energy for final heating of tap hot-water and/or in order to give an addition of heat to the medium in the first circuit C1. However, the second heat pump 11 could as an alternative be arranged to emit heat energy for another heating purpose.

The heating installation 1 comprises a first accumulator tank A1 and a second accumulator tank A2 arranged in series with each other in the second circuit C2 for accumulating the medium in the second circuit. The first and second accumulator tanks A1, A2 are arranged in the second circuit C2 in series with the heat exchanger 10, and the second accumulator tank A2 is arranged in the second circuit C2 downstream of the first accumulator tank A1 as seen in a flow direction from the above-mentioned outlet 10b of the heat exchanger 10 to the above-mentioned inlet 10a thereof. The first and second accumulator tanks A1, A2 are alternately connectable to the second heat pump 11 in order to allow medium to circulate between the first accumulator tank A1 and the evaporator 11a of the second heat pump in a first operating situation, and allow medium to circulate between the second accumulator tank A2 and the evaporator 11a of the second heat pump in a second operating situation. In said first operating situation, the second heat pump 11 is consequently utilizing heat energy accumulated in the first accumulator tank A1, whereby heat energy consequently is emitted from the first accumulator tank A1 at the same time as heat energy is allowed to be accumulated in the second accumulator tank A2. In said second operating situation, the second heat pump 11 is instead utilizing heat energy accumulated in the second accumulator tank A2, whereby heat energy consequently is emitted from the second accumulator tank A2 at the same time as heat energy is allowed to be accumulated in the first accumulator tank A1.

The alternating connection of the accumulator tanks A1, A2 to the second heat pump 11 is controlled by means of a control valve 12, which is selectably settable into a first position or a second position. In its first position, the control valve 12 keeps the first accumulator tank A1 connected to the second heat pump 11 and thereby allows medium to circulate between the first accumulator tank A1 and the evaporator 11a of the second heat pump, at the same time as medium is prevented from circulating between the second accumulator tank A2 and the evaporator 11a of the second heat pump. In its second position, the control valve 12 keeps the second accumulator tank A2 connected to the second heat pump 11 and thereby allows medium to circulate between the second accumulator tank A2 and the evaporator 11a of the second heat pump, at the same time as medium is prevented from circulating between the first accumulator tank A1 and the evaporator 11a of the second heat pump.

The control valve 12 is controlled by means of an electronic control device 13. The electronic control device 13 is configured to make the control valve 12 assume said first position or said second position in dependence on one or more predetermined control variables. In the embodiments illustrated in FIGS. 1-6, these control variables comprise a first temperature value T1 representing the temperature of the medium flowing in the second circuit C2 from an outlet 14 of the second accumulator tank A2 in the direction towards the inlet 10a of the heat exchanger 10, wherein this temperature value T1 is established by means of a temperature sensor 15 which is connected to the electronic control device 13. In the embodiments illustrated in FIGS. 2-6, said control variables also comprise a second temperature value T2 representing the temperature of the medium flowing in the second circuit C2 from an outlet 16 of the first accumulator tank A1 in the direction towards an inlet 17 of the second accumulator tank A2, wherein this temperature value T2 is established by means of a temperature sensor 18 which is connected to the electronic control device 13.

The second circuit C2 comprises a feed conduit 19 which is connected to an inlet 11g of the evaporator 11a of the second heat pump and through which medium from the first accumulator tank A1 and medium from the second accumulator tank A2 can be alternately conveyed into the evaporator 11a of the second heat pump, and a return conduit 20 which is connected to an outlet 11h of the evaporator 11a of the second heat pump and through which medium can be conveyed back to the first or second accumulator tank A1, A2 from the evaporator 11a of the second heat pump. In the embodiments illustrated in FIGS. 1, 2 and 4-6, the control valve 12 is arranged in the feed conduit 19, and in the embodiment illustrated in FIG. 3, the control valve 12 is arranged in the return conduit 20.

The second circuit C2 further comprises a shunt conduit 21, via which the return conduit 20 is connected to the feed conduit 19 in order to allow medium flowing via the feed conduit 19 from one of said first and second accumulator tanks A1, A2 in the direction towards said inlet 11g of the evaporator 11a of the second heat pump to be mixed with medium which is returned via the shunt conduit 21 from said outlet 11h to said inlet 11g of the evaporator 11a of the second heat pump. The mixing proportion between medium flowing from one of said first and second accumulator tanks A1, A2 through the feed conduit 19 and medium supplied to the feed conduit 19 from the shunt conduit 21 is regulated by means of a regulating valve 22. In the embodiments illustrated in FIGS. 1 and 3-6, the regulating valve 22 is arranged in the feed conduit 19, and in the embodiment illustrated in FIG. 2, the regulating valve 22 is arranged in the return conduit 20. The regulating valve 22 is controlled by means of the electronic control device 13 in dependence on a third temperature value T3 representing the temperature of the medium flowing into the evaporator 11a of the second heat pump via said inlet 11g and/or a fourth temperature value T4 representing the temperature of the medium flowing out of the evaporator 11a of the second heat pump via said outlet 11h. These third and fourth temperature values T3, T4 are established by means of temperature sensors 23, 24 which are connected to the electronic control device 13.

By means of the regulating valve 22, the electronic control device 13 is capable of ensuring that the temperature of the medium flowing into the evaporator 11a of the second heat pump via the feed conduit 19 is kept at a predetermined level. The electronic control device 13 is configured to apply a first setpoint for this temperature in the above-mentioned first operating situation and a different second setpoint for this temperature in the above-mentioned second operating situation, wherein the first setpoint is higher than the second setpoint.

The circulation of the medium between the respective accumulator tank A1, A2 and the evaporator 11a of the second heat pump is achieved by means of a circulation pump 25, which in the illustrated embodiments is arranged in the feed conduit 19. This circulation pump 25 could alternatively be arranged in the return conduit 20.

In the embodiments illustrated in FIGS. 1-4 and 6, the heating installation 1 comprises a third circuit C3, which contains a liquid medium, such as for instance water. A circulation pump 26 is arranged in the third circuit C3 for circulating the medium in this circuit. The second heat pump 11 has its output side connected to the third circuit C3 so that heat exchange between the working medium of the second heat pump 11 and the medium in the third circuit C3 is possible via the condenser 11b of the second heat pump. A heat emitting device 27 is arranged in the third circuit C3 for heating tap hot-water by transfer of heat from the medium in the third circuit C3 to water which is intended to be heated in order to provide tap hot-water. In the embodiments illustrated in FIGS. 1-4 and 6, the tap hot-water final-heated by the heat emitting device 27 is stored in a third accumulator tank 28. Via a tap hot-water circuit C4, tap hot-water is conveyed from an outlet 29 of the third accumulator tank 28 to one or more tapping points 30, which for instance may be provided with hot-water taps. Tap hot-water that has passed the tapping points 30 without being tapped is conveyed back to the third accumulator tank 28. A circulation pump 31 is arranged in the tap hot-water circuit C4 for circulating the medium in this circuit. In the embodiments illustrated in FIGS. 1-3 and 6, no preheating of the tap hot-water takes place, and the third accumulator tank 28 is consequently arranged to receive cold water directly from a cold water supply line 32 in this case.

In the embodiments illustrated in FIGS. 1-4 and 6, the heat emitting device 27 comprises a heating coil 27a which is arranged in the third accumulator tank 28 and through which the medium in the third circuit C3 is allowed to flow in order to transfer heat from the medium in the third circuit C3 to the water in the third accumulator tank 28.

Figure 4:
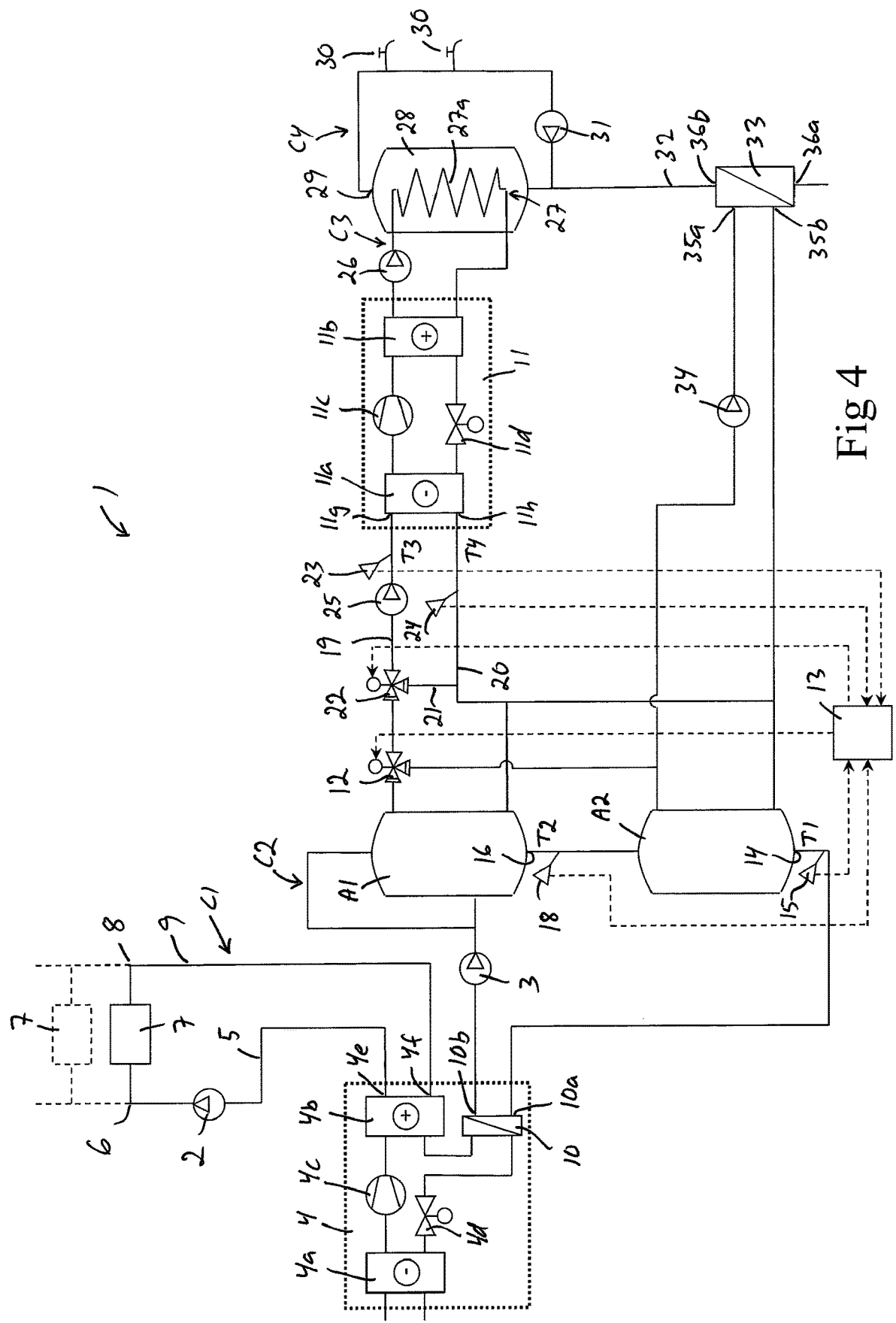

In the embodiment illustrated in FIG. 4, the heating installation 1 comprises a further heat exchanger 33, in the following denominated second heat exchanger, which is arranged in the second circuit C2 in order to transfer heat from the medium in the second circuit C2 to another medium. The second heat exchanger 33 is connected to the second accumulator tank A2 in order to allow medium to circulate between the second accumulator tank A2 and this heat exchanger 33. The circulation of medium between the second accumulator tank A2 and the second heat exchanger 33 is achieved by means of a circulation pump 34. In the illustrated example, the second heat exchanger 33 is connected to the water supply line 32 upstream of the third accumulator tank 28 and is consequently used for preheating the tap hot-water. The second heat exchanger 33 has a primary circuit which, via an inlet 35a and an outlet 35b of this primary circuit, is connected to the second circuit C2 in order to allow medium in the second circuit C2 to flow through the primary circuit, and a secondary circuit which, via an inlet 36a and an outlet 36b of this secondary circuit, is connected to the water supply line 32 in order to allow water in the water supply line 32 to flow through this secondary circuit.

Figure 5:
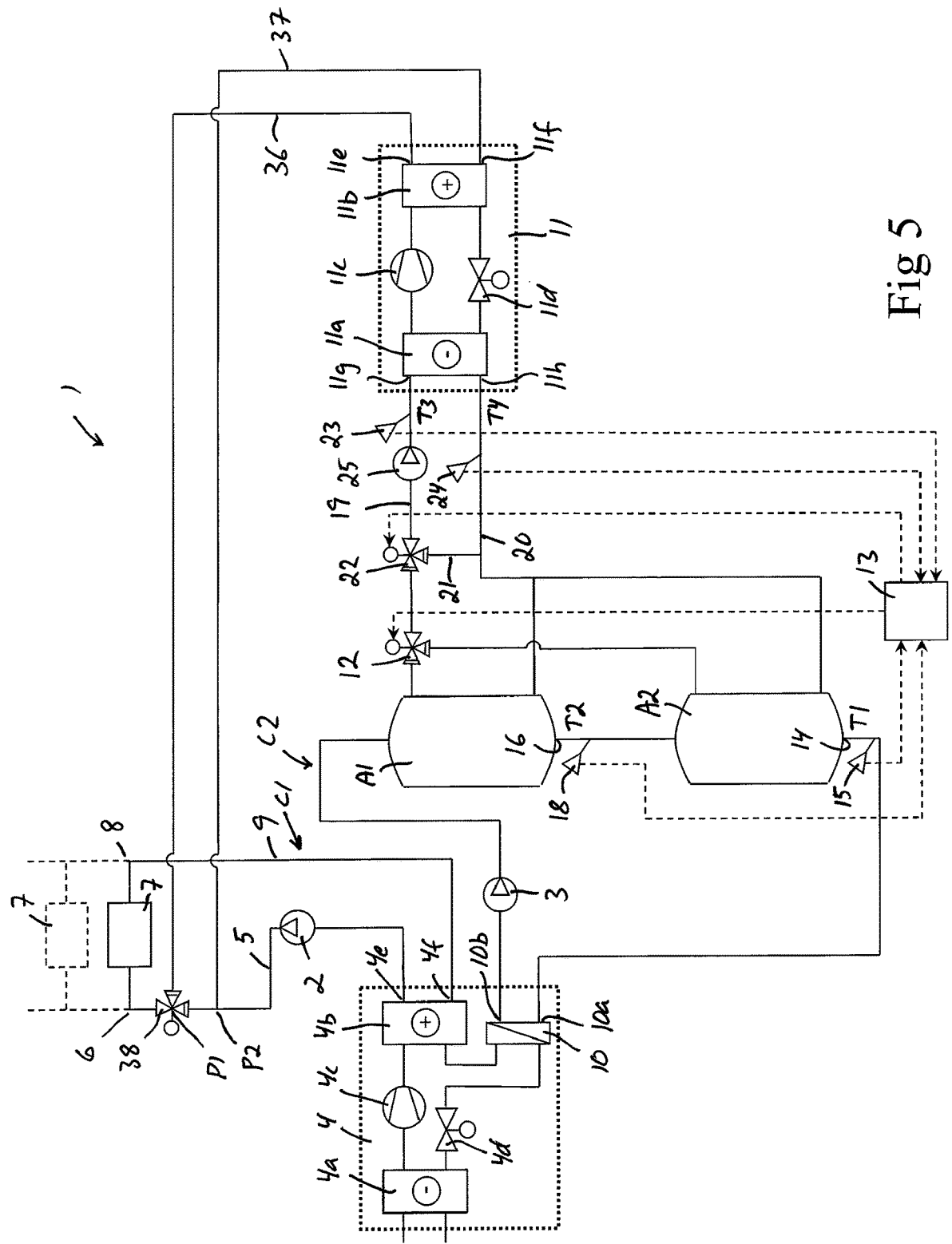
Figure 6:
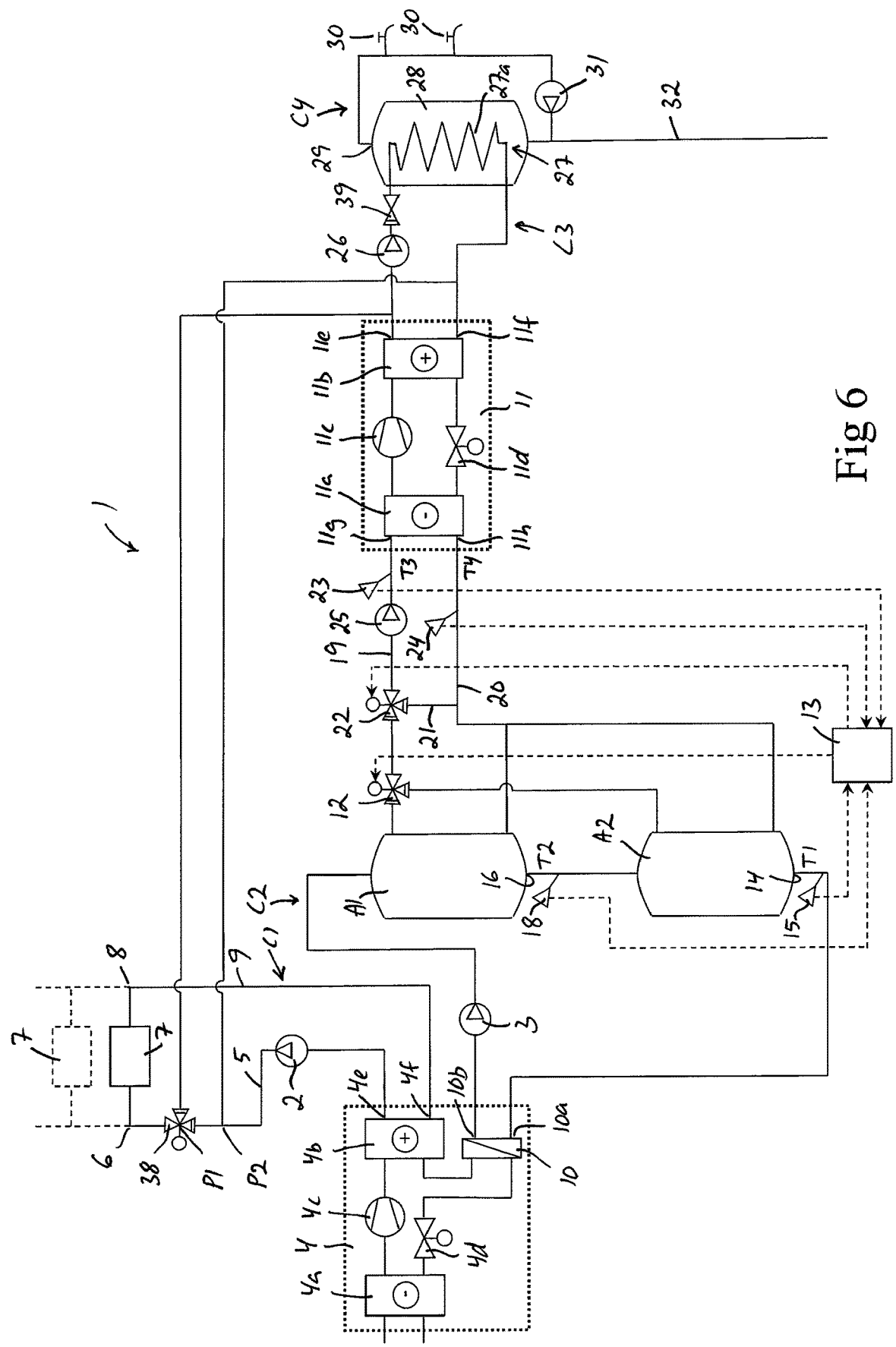

In the embodiments illustrated in FIGS. 5 and 6, the second heat pump 11 has its output side connected to the first circuit C1 so that heat exchange between the working medium of the second heat pump 11 and the medium in the first circuit C1 is possible via the condenser 11b of the second heat pump. In these embodiments, the second heat pump 11 is consequently arranged to utilize heat energy from the medium in the second circuit C2 in order to give an addition of heat to the medium in the first circuit C1 and thereby contribute to the heating of the air in the building in question via the heat emitting devices 7 arranged in the first circuit C1. An outlet 11e of the condenser 11b of the second heat pump is connected to the first circuit C1 via a first connecting conduit 36, and an inlet 11f of the condenser 11b of the second heat pump is connected to the first circuit C1 via a second connecting conduit 37. Medium may flow from the first circuit C1 to the condenser 11b of the second heat pump via the second connecting conduit 37, through the condenser 11b of the second heat pump while absorbing heat from the working medium of the second heat pump 11, and then back to the first circuit C1 via the first connecting conduit 36. In the embodiments illustrated in FIGS. 5 and 6, the first connecting conduit 36 is connected to the first circuit C1 at a first point P1 located in the feeding conduit 5, whereas the second connecting conduit 37 is connected to the first circuit C1 at a second point P2 located in the feeding conduit 5 upstream of said first point P1. In the embodiments illustrated in FIGS. 5 and 6, the first connecting conduit 36 is connected to the first circuit C1 via a regulating valve 38, by means of which the flow through the connecting conduits 36, 37 can be regulated. This regulating valve 38 is consequently arranged at said first point P1. Furthermore, in the embodiment illustrated in FIG. 6, a non-return valve 39 is arranged in the third circuit C3.

The invention is of course not in any way limited to the embodiments described above. On the contrary, many possibilities to modifications thereof should be apparent to a person skilled in the art without thereby deviating from the basic idea of the invention as defined in the appended claims.

The invention claimed is:
1. A heating installation comprising:
a first circuit (C1) containing a medium;
a second circuit (C2) containing a medium;
a first heat pump (4) arranged for heating the medium in the first circuit (C1);
a heat exchanger (10) which is arranged in the second circuit (C2) and connected between a condenser (4b) and an expansion valve (4d) of the first heat pump (4) to transfer heat from a working medium of the first heat pump (4) to the medium in the second circuit (C2); and
a second heat pump (11) arranged for heating a medium by absorbing heat energy from the medium in the second circuit (C2), wherein
the second heat pump (11) has its input side connected to the second circuit (C2) so that heat exchange between the medium in the second circuit (C2) and a working medium of the second heat pump (11) is possible via an evaporator (11a) of the second heat pump (11),
the heating installation (1) comprises a first accumulator tank (A1) and a second accumulator tank (A2) arranged in series with each other in the second circuit (C2) for accumulating the medium in the second circuit,
the second accumulator tank (A2) is arranged in the second circuit (C2) downstream of the first accumulator tank (A1) as seen in a flow direction from an outlet (10b) of said heat exchanger (10) to an inlet (10a) thereof,
the first and second accumulator tanks (A1, A2) are alternately connectable to the second heat pump (11) to allow medium to circulate between the first accumulator tank (A1) and the evaporator (11a) of the second heat pump in a first operating situation and between the second accumulator tank (A2) and the evaporator (11a) of the second heat pump in a second operating situation, the heating installation (1) comprises a control valve (12) which is selectably settable into a first position or a second position,
the control valve (12) in its first position keeps the first accumulator tank (A1) connected to the second heat pump (11) and thereby allows medium to circulate between the first accumulator tank (A1) and the evaporator (11a) of the second heat pump, and in its second position keeps the second accumulator tank (A2) connected to the second heat pump (11) and thereby allows medium to circulate between the second accumulator tank (A2) and the evaporator (11a) of the second heat pump, and
the heating installation (1) comprises an electronic control device (13) which is configured to control said control valve (12) and make the control valve (12) assume said first position or said second position in dependence on one or more predetermined control variables.

2. A heating installation according to claim 1, wherein said one or more control variables comprise a temperature value (T1) representing the temperature of the medium flowing in the second circuit (C2) from an outlet (14) of the second accumulator tank (A2) in the direction towards said inlet (10a) of said heat exchanger (10), and
the heating installation (1) comprises a temperature sensor (15) which is connected to the electronic control device (13) and configured to establish this temperature value (T1).

3. A heating installation according to claim 2, wherein said one or more control variables also comprise a temperature value (T2) representing the temperature of the medium flowing in the second circuit (C2) from an outlet (15) of the first accumulator tank (A1) in the direction towards an inlet (17) of the second accumulator tank (A2), and
the heating installation (1) comprises a temperature sensor (18) which is connected to the electronic control device (13) and configured to establish the last-mentioned temperature value (T2).

4. A heating installation according to claim 1, wherein the second circuit (C2) comprises a feed conduit (19) which is connected to an inlet (11g) of the evaporator (11a) of the second heat pump and through which medium from the first accumulator tank (A1) and medium from the second accumulator tank (A2) can be alternately conveyed into the evaporator (11a) of the second heat pump, and a return conduit (20) which is connected to an outlet (11h) of the evaporator (11a) of the second heat pump and through which medium can be conveyed back to the first or second accumulator tank (A1, A2) from the evaporator (11a) of the second heat pump,
the second circuit (C2) comprises a shunt conduit (21), via which said return conduit (20) is connected to said feed conduit (19) to allow medium flowing from one of said first and second accumulator tanks (A1, A2) in the direction towards said inlet (11g) of the evaporator (11a) of the second heat pump to be mixed with medium which is returned via the shunt conduit (21) from said outlet (11h) to said inlet (11g) of the evaporator (11a) of the second heat pump,
the heating installation (1) comprises a regulating valve (22) for regulating the mixing proportion between medium flowing from one of said first and second accumulator tanks (A1, A2) in the direction towards said inlet (11g) of the evaporator (11a) of the second heat pump and medium which is returned via said shunt conduit (21) from said outlet (11h) to said inlet (11g) of the evaporator (11a) of the second heat pump, and the electronic control device (13) is configured to control said regulating valve (22) in dependence on a temperature value (T3) representing the temperature of the medium flowing into the evaporator (11a) of the second heat pump via said inlet (11g) and/or a temperature value (T4) representing the temperature of the medium flowing out of the evaporator (11a) of the second heat pump via said outlet (11h).

5. A heating installation according to claim 1, wherein the first accumulator tank (A1) and the second accumulator tank (A2) are arranged in the second circuit (C2) in series with said heat exchanger (10).

6. A heating installation according to claim 1, wherein
the heating installation (1) comprises a third circuit (C2) containing a medium,
the second heat pump (11) has its output side connected to the third circuit (C3) so that heat exchange between the working medium of the second heat pump (11) and the medium in the third circuit (C3) is possible via a condenser (11b) of the second heat pump (11), and
the heating installation (1) comprises a heat emitting device (27) which is arranged in the third circuit (C3) for heating tap hot-water by transferring heat from the medium in the third circuit (C3) to water which is intended to be heated to provide tap hot-water.

7. A heating installation according to claim 6, wherein the heating installation (1) comprises a third accumulator tank (A3) for accumulating the tap hot-water heated by said heat emitting device (27).

8. A heating installation according to claim 7, wherein said heat emitting device (27) comprises a heating coil (27a) which is arranged in the third accumulator tank (A3) and through which the medium in the third circuit (C3) is allowed to flow to transfer heat from the medium in the third circuit (C3) to the water in the third accumulator tank (A3).

9. A heating installation according to claim 1, wherein
the heating installation (1) comprises one or more heat emitting devices (7) which are arranged in the first circuit (C1) to transfer heat from the medium in the first circuit (C1) to air within a building, and
the second heat pump (11) has its output side connected to the first circuit (C1) so that heat exchange between the working medium of the second heat pump (11) and the medium in the first circuit (C1) is possible via a condenser (11b) of the second heat pump (11).

10. A heating installation comprising:
a first circuit (C1) containing a medium:
a second circuit (C2) containing a medium;
a first heat pump (4) arranged for heating the medium in the first circuit (C1);
a heat exchanger (10) which is arranged in the second circuit (C2) and connected between a condenser (4b) and an expansion valve (4d) of the first heat pump (4) to transfer heat from a working medium of the first heat pump (4) to the medium the second circuit (C2); and
a second heat pump (11) arranged for heating a medium by absorbing heat energy from the medium in the second circuit (C2), wherein
the second heat pump (11) has its input side connected to the second circuit (C2) so that heat exchange between the medium in the second circuit (C2) and a working medium of the second heat pump (11) is possible via an evaporator (11a) of the second heat pump (11),
the heating installation (1) comprises a first accumulator tank (A1) and a second accumulator tank (A2) arranged in series with each other in the second circuit (C2) for accumulating the medium in the second circuit,
the second accumulator tank (A2) is arranged in the second circuit (C2) downstream of the first accumulator tank (A1) as seen in a flow direction from an outlet (10b) of said heat exchanger (10) to an inlet (10a) thereof,
the first and second accumulator tanks (A1, A2) are alternately connectable to the second heat pump (11) to allow medium to circulate between the first accumulator tank (A1) and the evaporator (11a) of the second heat pump in a first operating ion and, between the second accumulator tank (A2) and the evaporator (11a) of the second heat pump in a second operating situation,
the heating installation (1) comprises a further heat exchanger (33) which is arranged in the second circuit (C2) to transfer heat from the medium in the second circuit (C2) to another medium, and
this further heat exchanger (33) is connected to the second accumulator tank (A2) to allow medium to circulate between the second accumulator tank (A2) and this further heat exchanger (33).

11. A heating installation according to claim 10, wherein said further heat exchanger (33) is arranged to preheat tap hot-water by transferring heat from the medium in the second circuit (C2) to water in a water supply line (32).

* * * * *